United States Patent [19]

Ohta et al.

[11] 4,148,644
[45] Apr. 10, 1979

[54] LIGHT-SENSITIVE SILVER HALIDE PHOTOGRAPHIC MATERIALS

[75] Inventors: Hideyasu Ohta; Masayoshi Mayama, both of Hino, Japan

[73] Assignee: Konishiroku Photo Industry Co., Ltd., Tokyo, Japan

[21] Appl. No.: 848,358

[22] Filed: Nov. 3, 1977

[30] Foreign Application Priority Data

Nov. 5, 1976 [JP] Japan ................... 51-133044

[51] Int. Cl.$^2$ .................. G03C 5/14; G03C 7/24; G03C 1/78
[52] U.S. Cl. .............................. 96/39; 96/4; 96/87 R
[58] Field of Search ............. 96/39, 87, 4; 427/127, 427/128, 129, 130, 307, 308

[56] References Cited

U.S. PATENT DOCUMENTS

| | | | |
|---|---|---|---|
| 2,883,301 | 4/1959 | Prichard et al. | 427/129 |
| 3,418,126 | 12/1968 | Ariga et al. | 96/39 X |
| 3,704,167 | 11/1972 | Yamamoto et al. | 427/129 |
| 4,058,646 | 11/1977 | Vaeth et al. | 427/128 X |

*Primary Examiner*—Edward C. Kimlin
*Assistant Examiner*—Alfonso T. Suro Picó
*Attorney, Agent, or Firm*—Finnegan, Henderson, Farabow & Garrett

[57] ABSTRACT

A light-sensitive silver halide photographic material having a cellulose ester film support coated on one side with a silver halide emulsion layer and on the other side with a non-light sensitive layer that is removable during an aqueous processing step. An optional portion of the non-light sensitive layer is coated with a magnetic recording layer formed from a dispersion containing at least 60% by weight of 2-ethoxyethanol. The resulting magnetic recording layer exhibits layer adhesion during subsequent development steps.

6 Claims, No Drawings

LIGHT-SENSITIVE SILVER HALIDE PHOTOGRAPHIC MATERIALS

This invention relates to a light-sensitive silver halide photographic material comprising a magnetic recording layer.

More particularly, the invention is concerned with a novel light-sensitive silver halide photographic material comprising a cellulose ester film as a support, one side of said support being coated with a light-sensitive silver halide emulsion layer and the other side thereof being coated with a non-light sensitive layer capable of dissolving out or removable from the support during one of the aqueous processing steps, wherein a magnetic recording layer is further coated on an appropriate portion of the surface of said non-light sensitive layer so that at the time of processing the photographic material, said magnetic recording layer may not be removed from the support together with a certain area of the non-light sensitive layer which area corresponds to the magnetic recording layer coated thereon.

Generally, light-sensitive silver halide photographic materials such as movie films are provided with an antihalation layer which contains dyes or pigments and is composed mainly of a binder removable during one of the aqueous processing steps after exposure, particularly an alkali development step, for the purpose of preventing said photographic materials from halation and also of shielding the same from light when handled under daylight. Further, such photographic materials are coated sometimes with an antistatic layer removable during a processing step on the opposite side of the support having coated thereon a light-sensitive photographic layer, for the purpose of preventing said materials from such hindrance that the photographic materials are electrically charged and static electricity is discharged to form the so-called static marks on the light-sensitive photographic layer.

In providing such photographic materials with a magnetic recording layer, if the magnetic recording layer is simply applied onto the above-mentioned antihalation or antistatic layer, a part or whole of the magnetic recording layer thus formed falls off together with the antihalation or antistatic layer from the support during aqueous processing step, with the result that the photographic material thus provided with the magnetic recording layer cannot practically be used.

There have heretofore been proposed, therefore, various processes for the improvement of movie films comprising a magnetic recording layer for the purpose that the magnetic recording layer formed on an adequate portion of a layer such as an antihalation layer may not be removed together with layer such as the antihalation layer during aqueous processing step from the support thereof and, at the same time, the magnetic recording layer may strongly adhere to the support.

In known processes disclosed, for example, in Japanese Laid-Open-to Public Publications Nos. 5014/1976, 62627/1975, 4503/1974 and 15422/1974, and Japanese Patent Publication No. 11566/1974, such a polyfunctional compound, as may be linked to a binder of an antihalation layer to provide a three-dimensional structure, is incorporated into a coating dispersion for forming a magnetic recording layer, or a solution of this polyfunctional compound in an organic solvent is applied to the antihalation layer prior to coating a magnetic recording layer. The adhesive strength between the antihalation layer and the support during development step is improved according to the above-mentioned processes. The binder of the antihalation layer is however too strained as the result of formation of the three-dimensional structure after the development and drying treatments and the improved adhesive strength during the processing reversely decreases after the processing because of the stress applied thereto. Thus, these techniques are not deemed preferable.

Further, Japanese Laid-Open-to-Public Publication No. 89721/1976 discloses a process in which monofunctional compounds are used in place of the aforesaid polyfunctional compounds, thereby eliminating various drawbacks which are brought about at the time of cross-linking the antihalation layer. However, this process still has many defects. That is, most of such monofunctional compounds have such drawback that they tend to react with such binders for example, as gelatin, used in the uppermost layer formed on a light-sensitive photographic layer. Accordingly, in case rolled-up light-sensitive silver halide photographic materials are stored or used, or in case light-sensitive photographic materials are stored by placing one upon the other, so that a magnetic recording layer is brought about into contact with a light-sensitive photographic layer, this process brings about such drawback that a so-called sticking phenomenon which frequently occurs particularly under the conditions of high temperature and high humidity is observed wherein the surface of uppermost layer formed on the light-sensitive photographic layer adheres to a part or whole of the surface of the magnetic recording layer formed on the reverse side of the photographic material and a part or whole of the light-sensitive photographic layer or magnetic recording layer peels off from the light-sensitive photographic material.

On the other hand, as processes having the same object as in the above-mentioned processes, U.S. Pat. Nos. 3,220,843 and 3,243,376 disclose a process in which lower N,N-dialkylamide of fatty acid is incorporated into a coating dispersion for forming a magnetic recording layer, and U.S. Pat. No. 3,647,541 discloses a process in which a mixture comprising about 15–35% by weight of dioxanes and about 85–65% by weight of 2-methoxyethanol is used as a dispersion medium for a coating dispersion for forming a magnetic recording layer. The present inventors, however, found that in the practice of these processes, a part of the magnetic recording layer thus formed peeled off in some cases from a film support of photographic material during a development step and the adhesion strength between the magnetic recording layer and the support was not sufficient. Further, the above-mentioned process which uses a mixture of dioxanes and 2-methoxyethanol as a dispersion medium had such a drawback that when a cellulose ester film was used as a support, the resulting support film was transformed.

Accordingly, a primary object of the present invention is to provide a novel method for forming a magnetic recording layer on a backing layer, particularly a non-light sensitive layer removable during one of the aqueous processing steps which are for forming an image on said photographic material after exposure, said novel method being free from various drawbacks shown in the above-mentioned prior art processes. That is, the primary object of the present invention is to provide a method for forming a magnetic recording layer, which method has such advantages that (a) during, and before and after, the above-mentioned aqueous processing steps, the adhesion obtained is selectively strong only as to a part of support on which a magnetic recording layer has been formed through a non-light sensitive layer, a part of the non-light sensitive layer on which the magnetic recording layer has been formed, and the magnetic recording layer thus formed, (b) even after forming a magnetic recording layer, a light-sensitive silver halide photographic material is not subject to transformation, (c) the so-called sticking phenomenon is not observed between the surface of magnetic recording layer formed on one side of the support and the surface of light-sensitive layer formed on the other side of the support, (d) no adverse effect is exerted on photographic properties of the light-sensitive silver halide photographic material, (e) excellent effects are obtained particularly when a cellulose ester film is used as a support, and (f) a phenomenon of removal during one of said aqueous processing steps of a portion of said non-light sensitive layer on which no magnetic recording layer has been formed is not hindered by formation of the magnetic recording layer.

Further, a secondary object of the present invention is to provide a novel and useful light-sensitive silver halide photographic material which comprises a magnetic recording layer formed thereon by means of the above-mentioned novel method for forming magnetic recording layer.

The above-mentioned objects as well as other objects of the present invention which will become apparent from the following description may be accomplished in a process of manufacturing a light-sensitive silver halide photographic material having a light-sensitive silver halide emulsion layer on one side of a cellulose ester film support and a non-light sensitive layer on the other side of the support, a portion of which non-light sensitive layer other than the certain portion thereof bearing a magnetic recording layer is removable during one of the aqueous processing steps after exposure of said photographic material, by coating a coating dispersion for forming the magnetic recording layer, the dispersion containing at least 60% by weight, based on the total weight of dispersion medium, of 2-ethoxyethanol as a component of the dispersion medium on said non-light sensitive layer and then drying to form the desired magnetic recording layer.

The present invention is characterized by the use of 2-ethoxyethanol as a main dispersion medium of a coating dispersion for forming a magnetic recording layer. It is not clear what functional mechanism makes a magnetic recording layer markedly and strongly adhesive to a cellulose ester film support through a non-light sensitive layer as well as to the non-light sensitive layer. It is considered, however, that 2-ethoxyethanol favorably dissolves a binder of a coating dispersion for forming a magnetic recording layer and also readily dissolves a binder of the aforesaid backing non-light sensitive layer and further swells or dissolves a cellulose ester film which is used as a support, with the result that the binder of coating dispersion for forming a magnetic recording layer, which binder is insoluble in water, acidic and alkaline solution, permeates into said backing non-light sensitive layer, or said two binders are mixed together, thereby rendering the only portion of the non-light sensitive layer, on which portion the magnetic recording layer has been formed, insoluble in water, acidic and alkaline solution used during the aqueous processing steps. It is further considered that 2-ethoxyethanol which has diffused and permeated into the non-light sensitive layer further reaches to the surface of cellulose ester film support and dissolves said surface, thereby cellulose ester and the binder of the non-light sensitive layer are mixed together.

In the present invention in which a cellulose ester film is used as a support, since 2-ethoxyethanol which is the main dispersion medium of coating dispersion for forming a magnetic recording layer has an appropriate power of dissolving said support, the resulting photographic film coated with a magnetic recording layer is not distorted or transformed. Further, the coating dispersion for forming a magnetic recording layer of the present invention can be so prepared as to be substantially free from such monofunctional or polyfunctional compounds as chemically combining with gelatin present in a light-sensitive photographic layer, and as the result the sticking phenomenon which is observed when the surface layer on the side of the light-sensitive photographic layer and that of the magnetic recording layer are brought into contact with each other can be prevented and, in addition, without causing any detrimental influence on photographic properties of the resulting light-sensitive silver halide photographic material.

The coating dispersion for forming a magnetic recording layer used in the present invention is a dispersion prepared by dispersing a magnetizable particulate magnetic material and a binder therefor into a dispersion medium containing at least 60% by weight, based on the total weight of the dispersion medium, of 2-ethoxyethanol.

The binder for a magnetic recording layer is a film-forming polymer which favorably disperses thereinto a particulate magnetic material and which is insoluble in water, acidic and alkaline solution. This film-forming polymer may include, for example, cellulose derivatives, homopolymers of polymeric ethylenically unsaturated monomers, addition polymers obtained by combining two or more polymeric ethylenically unsaturated monomers, or condensation polymers such as polyesters or polyamides.

Advantageously usable as cellulose derivatives in the present invention, are those such as methyl cellulose, nitrocellulose, cellulose acetate, cellulose acetate butyrate and cellulose acetate propionate.

Further, polymeric ethylenically unsaturated monomers usable in the present invention include, for example, methyl acrylate, methyl methacrylate, ethyl acrylate, ethyl methacrylate, propyl acrylate, propyl methacrylate, butyl acrylate, butyl methacrylate, chloroethyl acrylate, chloroethyl methacrylate, hydroxyethyl acrylate, hydroxyethyl methacrylate, cyclohexyl acrylate, cyclohexyl methacrylate, 2-ethylhexyl acrylate, glycydyl acrylate, glycydyl methacrylate, phenyl acrylate, phenyl methacrylate, benzyl acrylate, benzyl methacrylate, phenylethyl acrylate, phenylethyl methacrylate, chloromethyl acrylate, chloromethyl methacrylate, 4-chlorobutyl acrylate, 4-chlorobutyl methacrylate, N,N-diethyl acrylate, N,N-diethyl methacrylate, sulfopropyl methacrylate, 2-ethoxyethyl acrylate, 2-ethoxyethyl methacrylate, acrylamide, methacrylamide, N-alkylacrylamide (the alkyl moeity is, e.g. methyl, ethyl, propyl, butyl, amyl or hexyl), N,N-dialkylacrylamide (the alkyl moeity is, e.g. methyl, ethyl, propyl, butyl or amyl, and the two alkyl groups may be the same or different), N-phenylacrylamide, N-benzylacrylamide, N-phenylethylacrylamide, N-methylolacrylamide, N-hydroxyethylacrylamide, N,N-dihydroxyethylacrylamide, N-oxycarbonylmethyl acrylamide, N-oxycarbonylethyl acrylamide, N-oxycarbonylphenyl acrylamide, acrylonitrile, methacrylonitrile, α-chloroacrylonitrile, alkyl-α-chloroacrylate or alkyl-α-chloromethacrylate (the alkyl moeity is, e.g. methyl, ethyl, propyl, butyl, benzyl or cyclohexyl), acrolein, methacrolein, vinylisocyanate, isopropyl isocyanate, styrene, α-methylstyrene, p-chloromethylstyrene, m-chloromethylstyrene, o-chloromethylstyrene, vinyl methyl ether, vinyl ethyl ether, vinyl acetate, vinyl propionate, vinyl chloroacetate, vinyl trichloroacetate, acrylic acid, methacrylic acid, itaconic acid, itaconic anhydride, methylitaconic acid monoester, ethylitaconic acid monoester, maleic anhydride, alkylmaleic acid monoester (the alkyl moeity is, e.g. methyl, ethyl, propyl, amyl, hexyl, benzyl, octyl or pentyl), alkylfumaric acid monoester (the alkyl moeity is the same as in alkylmaleic acid monoester) and crotonic acid, etc. Homopolymers, addition polymers or condensation polymers of these monomers may be prepared by procedure known to those skilled in the art, for example, solution polymerization or emulsion polymerization process.

The aforementioned cellulose derivatives, homopolymers, addition polymers or condensation polymers may be used, either singly or in admixture of two or more, as a binder for the magnetic recording layer of the present invention. Preferable results can be obtained when nitrocellulose is used singly or in a mixture comprising nitrocellulose and less than 50% by weight, preferably less than 30% by weight, based on the nitrocellulose, of other binder is used as a binder in the magnetic recording layer of the present invention. This is partly ascribable to the fact that nitrocellulose is excellent in durability against carbon tetrachloride, trichloroethylene or perchloroethylene which is used for removing dust adhered to films.

The above-mentioned binder is preferably incorporated into a coating dispersion for forming a magnetic recording layer in an amount of 3 to 30% by weight, more preferably 6 to 20% by weight, based on the coating dispersion.

Among nitrocelluloses advantageously usable in the present invention, moreover, those having a nitrogen content of 10 to 12% or thereabouts and an average polymerization degree of about 25–500, preferably 35–200 or so, are more preferably usable in the present invention. Such preferred nitrocellulose may be prepared according to procedure known, per se, but there may also be used commercially available products, for example, H ½, H ¼, H ⅛, H 1, H 2, L ¼ and L ⅛ produced and sold by Asahi Kasei Kogyo K.K.; RS ¼, RS ½, SS ¼ and SS ½ produced and sold by Hercules Co.; HC 15, HB 14 and LB 14 produced and sold by Du Pont Co.; and HX 8-13, HX 30-50 and LX 20-40 produced and sold by Imperial Chemical Industries.

Further, the coating dispersion for forming a magnetic recording layer of the present invention is preferably incorporated, in addition to the above-mentioned binder, with at least one natural or synthetic rubber of diolefin type polymers with the view of improving a magnetic recording layer in anti-scratch property, pliability and adhesive property.

The above-mentioned diolefin type polymers may include homopolymers of diolefin monomers such as butadiene, 2-chloroprene, isoprene, neoprene and 2,3-dimethylbutadiene, or copolymers composed of two or more diolefin monomers aforementioned or copolymers composed of at least one of the diolefin monomers aforementioned and at least one of the aforementioned polymeric ethylenically unsaturated monomers. In the last case mentioned above, however, the diolefin monomer units in the copolymer of the diolefin monomer or monomers and ethylenically unsaturated monomer or monomers must be at least 30% by weight. Further, an average molecular weight of the above-mentioned diolefin type polymer rubber is about 3000 to about 500,000.

Among these diolefin type polymer rubbers, a preferable example is an acrylonitrile-butadiene copolymer. Among such acrylonitrile-butadiene copolymers, those having the acrylonitrile content of 5 to 50% by weight are more preferable, and those having the acrylonitrile content of 20 to 40% by weight and an average molecular weight of 4,000 to 6,000 are particularly preferable. Particularly preferable acrylonitrile-butadiene copolymer (nitrile rubber) includes such readily commercially available liquid nitrile rubber as Nipol-1312 (produced and sold by Nihon Zeon K.K.).

The coating dispersion for forming a magnetic recording layer of the present invention is preferably incorporated with the above-mentioned diolefin type polymer rubber in an amount of 0.05 to 5 times by weight, more preferably 0.1 to 2 times by weight, that of the aforementioned binder.

As particulate magnetizable magnetic materials usable in the present invention, of which the magnetic permeability and magnet keeping power are variable, in a coating dispersion for forming a magnetic recording layer, accordingly in a magnetic recording layer of the present invention, there can be used all the particulate magnet materials known to the industry concerned. For example, iron oxides such as $\gamma\text{-}Fe_2O_3$ and $Fe_3O_4$ or ferromagnetic oxides such as Co-Containing $Fe_2O_3$ and Co-containing $Fe_3O_4$ are usable and further such alloys, for example, as cobalt-nickel, cobalt-iron and cobalt-iron-nickel alloys may also be used. These particulate magnetic materials may be prepared according to any procedure, per se, known to the art. There may be used commercially available particulate magnetic materials, for example, γ-Sp, γ-LOP and γ-MR (produced and sold by Titan Kogyo K.K.), MRM-400 (produced and sold by Toda Kogyo K.K.), and MO-2228 (produced and sold by Pfizer Co).

The above-mentioned magnetic material is preferably incorporated into a coating dispersion for forming a magnetic recording layer in an amount of 10–50% by weight, preferably, 15–35% by weight.

The coating dispersion for forming a magnetic recording layer used in the present invention is advantageously incorporated with various plasticizers which are used for the purpose of improving the resulting magnetic recording layer in physical properties such as formability, strength, pliability and adhesive property. Such plasticizers include low molecular plasticizers, for example, phthalic acid esters such as dibutyl phthalate, di-2-ethylhexyl phthalate and di-n-octyl phthalate, aliphatic dibasic acid esters such as di-n-butyl sebacate and di-iso-octyl adipate, aromatic carboxylic acid esters such as diethyleneglycol dibenzoate and tri-n-octyl trimellitate, phosphoric acid esters such as tricresyl phosphate, trioctyl phosphate and triphenyl phosphate, ethylphthalyl-ethyl glycolate and butylphthalyl butyl. Usable as high molecular plasticizers, are polyester type plasticizers such as polypropylene adipate and polypropylene sebacate. Among these plasticizers, those which are preferably usable in the present invention are dibutyl phthalate, dioctyl phthalate, tricresyl phosphate and triphenyl phosphate, in particular.

The above-mentioned plasticizers are preferably incorporated into the coating dispersion for forming a magnetic recording layer in an amount of 0.05–1.0 times by weight the weight of the aforementioned binder present in said coating dispersion.

Further, the coating dispersion for forming a magnetic recording layer used in the present invention may be incorporated with known lubricants such as silicone oil, trifluorinated ethylene chloride and higher fatty acid esters for the purpose of preventing the magnetic recording layer surface from abrasion. The coating dispersion may also be incorporated with defoaming agents used for the purpose of removing bubbles from a coating dispersion for forming a magnetic recording layer, which bubbles are mixed in the coating dispersion at the time of preparation thereof; wetting agents used for the purpose of improving a coating dispersion for forming a magnetic recording layer in compatibility to a backing non-light sensitive layer; and in addition thereto dispersion stabilizers; anti-static agents and sticking-preventives. In the present invention, moreover, it is preferable that a compound, by which the binder present in the above-mentioned backing layer is cross-linked, is not substantially incorporated into the coating dispersion for forming a magnetic recording layer, though the incorporation of such compound is not intended to exclude from the scope of the present invention.

The dispersion medium of the coating dispersion for forming a magnetic recording layer used in the present invention is characterized in that it contains at least 60% by weight, preferably at least 75% by weight, based on the total weight of the dispersion medium, of 2-ethoxyethanol. As will be understood from the examples mentioned later, it is critical that the dispersion medium contains at least 60% by weight of 2-ethoxyethanol as aforesaid. If the amount of 2-ethoxyethanol used is less than 60% by weight, the effect of 2-ethoxyethanol on a non-light sensitive layer such as an antihalation layer and a cellulose ester film support weaken, whereby no sufficient adhesive property can be attained. Additional dispersion medium usable in combination with 2-ethoxyethanol as the dispersion medium of the present invention and usable in an amount of less than 40% by weight, preferably less than 25% by weight, of the total weight of the dispersion medium may be any organic solvent as long as it is compatible with 2-ethoxyethanol and also volatile. Preferably usable additional dispersion media include, for example, such alcohols as methyl alcohol, ethyl alcohol, propyl alcohol and butyl alcohol; such ketones as acetone, methyl ethyl ketone, methyl isobutyl ketone and cyclohexanone; such esters as methyl acetate, ethyl acetate, butyl acetate, amyl acetate and amyl formate; and, in addition thereto, methylene chloride and ethylene chloride; dioxane; methyl Cellosolve and butyl Cellosolve; methyl cellosolve acetate; 2-nitropropane; N,N-dimethylformamide and N,N-dimethylacetamide and hexamethyl triamide phosphate. These additional dispersion media may be used in combination with 2-ethoxyethanol either singly or in admixture of two or more in an amount ranging up to 40% by weight of the total weight of the dispersion medium.

The amount of the dispersion medium present in the coating dispersion for forming a magnetic recording layer, when a combination of 2-ethoxyethanol and other solvent is used in said medium, may somewhat vary depending on the kind, solvent power and evaporation speed of the solvent used. The dispersion medium, however, may be used in an amount ranging approximately from 40 to 85% by weight, preferably 45 to 75% by weight, of the coating dispersion without regard to the fact whether the dispersion medium contains 2-ethoxyethanol in combination with other solvents or not.

The coating dispersion for forming a magnetic recording layer used in the present invention may be prepared by any procedure known to the art concerned. The coating dispersion for forming a magnetic recording layer having favorably dispersed therein the above-mentioned components can be prepared by the use of a dispersing machine, for example, a ball mill, roll mill, high speed impeller mill or sand grinder.

For coating the above-mentioned coating dispersion for forming a magnetic recording layer on a backing non-light sensitive layer capable of being removable during one of the aqueous treatment steps after exposure, any known procedure can be adopted using a coating machine including, for example, those of rotary brush type, drawing pen type and foil type, wherein the coating dispersion is coated usually at the coating velocity of about 1–100 meter/min so that a magnetic recording layer having a wet layer thickness of about 10–70$\mu$, preferably about 15–40$\mu$, may be formed.

In the above case, the thus coated coating dispersion for forming a magnetic recording layer can be allowed, if necessary, to have the so-called directionality by the use of permanent magnet or electromagnet. Thereafter, the thus coated coating dispersion for forming a magnetic recording layer coated on the backing non-light sensitive layer is dried. When a light-sensitive photographic layer is formed on the support after coating a magnetic recording layer on the reverse of said support, the drying temperature after coating the magnetic recording layer at which said layer is dried is not particularly limitative. In case, however, a magnetic recording layer is formed on a backing non-light sensitive layer of a light-sensitive photographic material, which material having formed already on the surface a light-sensitive photographic layer, the magnetic recording layer thus formed is preferably dried in such a manner that during the step of drying the coated magnetic recording layer the surface temperature of the side of the light-sensitive photographic layer may be maintained at less than 60° C., preferably less than 50° C.

Drying techniques adoptable in the above case includes, for example, blast or blastless drying without using any heat source; blast drying by the use of parallel or vertical stream of hot air heated by use of heat medium such as an electric heater, infrared ray heater, high frequency heater, heated water or vapor used as heat sources; indirect drying by means of radiant heat generated by using the above-mentioned heat sources; and direct drying by means of heat transfer. These drying techniques may be adopted either singly or in combination with others.

In the present invention, the time necessary for the dispersion medium of the coating dispersion for forming a magnetic recording layer to diffuse and permeate into the backing non-light sensitive layer and then reach to the surface of film support is an important factor in a certain case. That is, when the coating dispersion for forming a magnetic recording layer coated on the backing non-light sensitive layer is dried exceedingly quickly, adhesion of the resulting magnetic recording layer to the film support sometimes becomes insufficient. On the other hand, when the coated dispersion for forming a magnetic recording layer is dried slowly, adhesion of the resulting magnetic recording layer to the film support can be satisfactorily attained, but the time necessary for the drying step is greatly prolonged, with the result that the cost of production sometimes is raised to bring about an economical disadvantage. In the present invention, therefore, it is preferable to carry out the drying of the coated dispersion for forming a magnetic recording layer for about ½–10 minutes, preferably 1–5 minutes, while maintaining the temperature of the surface (the uppermost layer or support surface) on the side of emulsion layer at less than 60° C., irrespective of the time either before or after coating the magnetic recording layer or the silver halide emulsion layer.

After the coating dispersion for forming a magnetic recording layer is coated and dried in the above manner, the resulting magnetic recording layer preferably has a dry layer thickness of 5–15$\mu$.

If necessary, moreover, after the coating dispersion for forming a magnetic recording layer is coated, before or after completion of the drying thereof, it may be subjected to the so-called calender processing in order to improve the resulting magnetic recording layer in smoothness of the surface thereof.

The magnetic recording layer of the present invention may be coated on an optional portion of the backing non-light sensitive layer in any form such as a continuous stripe form, a discontinous or independent Spotlike or rectangular form. For use in a sound track of movie film, the magnetic recording layer is preferably formed in the stripe form, preferably in the form of continuous stripe having a width of 0.2–2 mm or thereabouts. Although not essentially required in the present invention, a sticking-preventive layer as disclosed in U.S. Pat. No. 3,893,861 may be further formed, if necessary, on the magnetic recording layer.

The support for the light-sensitive silver halide photographic material according to the present invention is composed of a cellulose ester film obtained from such cellulose esters, for example, as cellulose triacetate, cellulose acetate butyrate and cellulose acetate propionate used either singly or in admixture thereof. In the present invention, when the support used is composed of cellulose triacetate, particularly preferable results can be obtained.

Usually, a cellulose ester film support is obtained by dissolving a cellulose ester in an organic solvent and allowing the resulting solution to flow, according to flow-spread method, on the surface of metal band in the general, followed by drying. In that case, the said solution is preferably incorporated with at least one of triphenyl phosphate, ethylphthalylethyl glycolate, dimethoxyethyl phthalate and biphenyldiphenyl phosphate, and may be further incorporated with other additives, for example, ultraviolet absorbers or the like. Further, cellulose ester films, whether they are stretched or unstretched, may be used as supports in the present invention.

As typical examples of a non-light sensitive layer formed on the reverse side of a light-sensitive photographic layer on a cellulose ester film support in the present invention, which non-light sensitive layer is removable during one of the aqueous treatment steps after exposure, there may be mentioned, for example, an after exposure, there may be mentioned, for example, an antihalation layer and antistatic layer. The non-light sensitive layer according to the present invention may also be a layer which has been formed for other purposes.

The antihalation layer comprises dyestuffs or pigments and a binder which is a polymer having film-forming property and capable of being soluble in either alkaline solution or acidic solution. Of the above-mentioned binders used in a backing antihalation layer, those which are more preferable as binders are polymers soluble in alkaline solution and having free carboxyl groups, for example, cellulose derivatives such as cellulose phthalate, cellulose acetate succinate, hydroxypropylmethylcellulose phthalate and cellulose acetate maleate, or copolymers of at least one selected from acrylic acid, methacrylic acid, maleic acid, crotonic acid and the like acids and at least one selected from styrene, vinyl acetate, alkyl esters of acrylic acid and alkyl esters of methacrylic acid. These binders may be used either singly or in admixture of two or more.

In the present invention, there are obtained preferable results when commercially available carbon black, for example, Valcan SC (produced by Cabot Corporation), Statex R Beads (produced by Columbian Carbon Company), Ma-11, MA-100, #900 and #1000 (produced by Mitsubishi Kasei Kogyo K.K.), is as pigment in the antihalation layer, and when commercially available cellulose derivatives having free carboxyl groups, for example, CA and CAP (produced by Daihachi Kogyosho K.K.), CAP (produced by Wako Junyaku K.K.), and HP-50 and HP-55 (produced by Shinetsu Kagaku Kogyo K.K.), are used as binder in the antihalation layer.

The antihalation layer may be coated usually according to the following procedure on a cellulose ester film support. First, the above-mentioned pigments or dyestuffs and the above-mentioned binders are added to an organic solvent capable of dissolving the binder for the antihalation layer, for example, acetone, methyl ethyl ketone, dioxane, methyl Cellosolve, ethyl Cellosolve, butyl Cellosolve, N,N-dimethylformamide or N,N-dimethylacetamide, used in combination with an appropriate dilute solvent, for example, methyl alcohol, ethyl alcohol, ethyl acetate, butyl acetate, amyl acetate, methyl lactate, ethyl lactate, toluene, benzene, 2-nitropropane or ethylene chloride, to prepare a coating liquid for a antihalation layer. Subsequently, the resulting coating solution is coated, prior to coating a silver halide emulsion, on the cellulose ester film support by means of a coating machine such as a double roll, immersion, gravure roll or kiss roll coating machine, and then dried by employing drying means, for example, hot air drying, heater roll drying or infrared heater drying, so that the temperature of said support may be maintained at not more than 120° C., preferably not more than 100° C. The thus obtained antihalation layer preferably has a layer thickness of 0.3–2.0$\mu$, preferably 0.8–1.4$\mu$ or and particularly about 1.0$\mu$.

Furthermore, in order to prevent sticking phenomenon between the antihalation layer and the light-sensitive emulsion layer, there may be also formed, in the manner as disclosed in U.S. Pat. No. 3,893,861, a sticking-preventing layer on the antihalation layer so that a backing non-light sensitive layer may have a double layer structure.

The antistatic layer may include in its scope any antihalation layers as long as they are capable of being removable during aqueous treatment steps. For example, such antistatic layers having the composition as disclosed in Japanese Laid-Open-to-Public Publication No. 54672/1975, U.S. Pat. Nos. 2,882,157, 3,573,093, 3,753,716 and 3,262,807 and capable of being applied according to the procedure as disclosed therein, may be advantageously usable in the present invention.

The aqueous treatment steps of processing an exposed light-sensitive black-and-white photographic material, wherein such non-light sensitive backing layer as an antihalation layer or antistatic layer may be removed from the support, comprises a step of processing the exposed light-sensitive photographic material with an alkaline developer solution containing as a developing agent an organic reducing agent, for example, hydroquinone or methol, together with antioxidants, development accelerators, buffers and development inhibitors; a step of carrying out water-washing or neutralization treatment in order to prevent hindrance brought about by a residual alkaline developer solution on the processed photographic material; a step of treating the exposed photographic material with an fixing solution in order that silver halide remaining in the light-sensitive emulsion layer after development is dissolved and removed and then the photographic material is stabilized to light which fixing solution is an alkaline fixing solution usually containing thiosulfate as the main ingredient together with sulfite or an acidic fixing solution further containing acids in addition to the composition of the alkaline fixing solution or an acidic film-hardening fixing solution further containing hadeners in addition to the composition of the acidic fixing solution; and a step of washing the developed photographic material with water to remove the fixing solution remaining on said material. The aqueous treatment steps of processing an exposed light-sensitive color photographic material comprises, in addition to the steps employed in the case of the black-and-white photographic material, a color development step, a bleach treatment step a bleach-fix treatment step or a step of treating the developed color photographic material, after water-washing and before drying, with a stabilizing solution in order to stabilize the dye image formed on said material. The non-light sensitive backing layer such as an antihalation layer or antistatic layer used in the present invention may be removed at any time during the aqueous treatment steps. Generally, however, it is desirable that the backing layer is removed during development with an alkaline developer solution or water-washing immediately after the alkaline development treatment. From the standpoint of easiness in selecting the composition of the non-light sensitive backing layer, the removal of the backing layer is preferably carried out during an alkaline development step.

The light-sensitive emulsion layer of the present invention is a light-sensitive photographic layer formed on the surface of a cellulose ester film support, which surface has been subjected to hydrophilization treatment, according to a procedure, per se, known, by treating the surface with an alkali solution or by forming a subbing layer on the surface. The light-sensitive photographic layer may be formed on the hydrophilized surface of cellulose ester film support, opposite to the surface support on which a non-light sensitive layer such as an antihalation layer or antistatic layer is formed, by coating a monochromatic emulsion, a coupler-in emulsion type-emulsion or a coupler in developer type-emulsion prepared by dispersing silver halide in an aqueous solution of natural or synthetic high molecular substance having such property of protective colloid as gelatin and incorporating the resulting dispersion, if necessary, with sensitizers, extenders, hardeners, surfactants or viscosity regulating agents, or by coating likewise one or two or more emulsions.

The light-sensitive silver halide photographic material in the present invention is useful for preparing long-reeled films, particularly movie films, though the present photographic material may be used in any form and for any purposes.

The present invention is concretely illustrated below with reference to examples, but the invention is not limited by these examples.

EXAMPLE 1

The following composition was kneaded three times by means of a three-roll mill.

| | |
|---|---|
| $\gamma \cdot Fe_2O_3$ | 300 g |
| Cellosolve dope | 426 g |
| Nitrile rubber | 79 g |
| 2-ethoxyethanol | 326 g |

Subsequently, the following composition was placed in a 1 l. ball mill case containing 250 pieces of steel balls of 15 mm in diameter, and then they were mixed at 130 r.p.m. for 1 hour.

| | |
|---|---|
| Mixture kneaded by means of the three-roll mill | 600 g |
| 2-methoxyethanol | 80 g |

The resulted mixture was filtered under pressure through a stainless steel filter, and the filtrate was then evacuated to remove air bubbles involved in the filtrate for a magnetic recording layer.

The coating dispersion for forming a magnetic recording layer thus obtained amounted to about 500 cc and showed a favorable state of dispersion. The $\gamma \cdot Fe_2O_3$ used herein as $\gamma$-SP (produced and sold by Titan Kogyo K.K.) and the nitrile rubber used was Nipol-1312 (produced and sold by The Nihon Zeon Co., Ltd.). The Cellosolve dope used herein was about 20.5% by weight of a solution prepared by dissolving a dry H ½ nitrocellulose (produced and sold by Ashai Kasei Industry Co., Ltd.) in 2-ethoxyethanol.

The coating dispersion for forming a magnetic recording layer was coated on three kinds of photographic films, respectively, by the use of Perfecto dual 8 mm sound Striper (manufactured by Shoei Bussan K.K.) and then dried at 40°-45° C. for 2 minutes to obtain the following samples (1), (2) and (3).

Sample (1): On a carbon backing layer of a movie film was coated a magnetic recording layer, about 0.7 mm width and 8μ thick, said movie film having on one side of a cellulose triacetate film support, 120μ thick, the carbon backing layer comprising cellulose acetate phthalate as a binder and a dispersion of carbon black and having a thickness of 1μ and an optical density of 1.4–1.6, and on the other side of the support an emulsion layer for color photography.

Sample (2): On an antistatic layer of a movie film was coated a magnetic recording layer, about 0.7 mm width and 10μ thick, said movie film having on one side of a cellulose triacetate film support, 120μ thick, the same antistatic layer as disclosed in Example 1 of U.S. Pat.

No. 3,573,093 and on the other side of the support a monochromatic emulsion layer.

Sample (3): On a carbon backing layer of a movie film was coated a magnetic recording layer, about 0.8 mm width and 13μ thick, adjusted thereafter by means of calender processing to 10μ thick, said movie film having on one side of a cellulose triacetate film support, 110μ thick, the carbon backing layer comprising HP-55 (produced by Shinetsu Kagaku Kogyo K.K.) as a binder and a dispersion of carbon black and having a 1μ thick and an optical density of 1.4–1.6, and on the other side of the support an emulsion layer for color photography.

Subsequently, the samples (1), (2) and (3) were individually subjected to adhesion test of magnetic recording layer according to the procedures mentioned in the following (A) and (B). The results obtained in each case of the samples were found favorable.

(A) Adhesion test of dry film before and after development:

The magnetic recording layer formed on each sample film is cut on the surface with a single-edged razor to a depth from the magnetic recording layer surface to the support surface and a pressure-sensitive adhesive tape is applied to the surface of a portion of magnetic recording layer thus cut and, thereafter the tape is abruptly peeled off from said surface in the direction of right angle to the cut, thereby to observe whether or not the magnetic recording layer peels off from the support.

(B) Adhesion test wet film during development step:

The magnetic recording layer formed on each sample film as wetted by immersing the film in an alkaline developer solution, neutralization solution, acidic fixing solution and then water-washing solution is rubbed on the surface with a rubber to observe whether or not the magnetic recording layer is wiped out.

It is understood in this connection that when a sample shows favorable results in the adhesion tests conducted according to the aforementioned procedures (A) and (B), the sample also shows sufficiently satisfactory results in various treatments actually involved in the operation on a commercial scale.

Further, in the case of the samples (1), (2) and (3), no sticking phenomenon was observed even when the film was reeled up at 25° C. and 80% RH, without causing any deformation of film.

For comparison, on the other hand, the same samples as in this example were prepared but using a mixture of 50% by weight of 2-ethoxyethanol and 50% by weight of 2-methoxyethanol as the dispersion medium of the coating dispersion for the magnetic recording layer. The samples as prepared were subject to deformation of film and twisted. In the adhesion test, the magnetic recording layer, when immersed in the alkaline developer solution, peeled off from the support.

EXAMPLE 2

Using a sand grinder (manufactured by Igarashi Kikai Seizo K.K.), the following composition was mixed and dispersed to prepare a dispersion.

| | |
|---|---|
| γ.Fe$_2$O$_3$ | 105 g |
| Cellosolve dope | 180 g |
| Tricresyl phosphate | 4 g |
| 2-ethoxyethanol | 180 g |
| 1,4-Dioxane | 80 g |

In the above case, the sand grinder was operated at 1800 r.p.m. in a 1 l. vessel containing 200 ml of glass beads of 1-2 mm in diameter.

Further, the Cellosolve dope used herein was the same composition as used in Example 1 and the γ-Fe$_2$O$_3$ was also the same one as in Example 1.

The dispersion thus prepared was filtered in the same way as in Example 1 and then freed from air bubbles likewise. The thus obtained coating dispersion for forming a magnetic recording layer was in the state of being favorably dispersed.

This dispersion was coated on three kinds of photographic films in the same manner as in Example 1 to prepare the following samples (4), (5) and (6).

Sample (4): The sample was prepared in the same manner as employed in the preparation of the sample (1), except that the coating dispersion for forming a magnetic recording layer as prepared in this example was used.

Sample (5): On an antistatic layer of a movie film was coated a magnetic recording layer, 2 mm width and 12μ thick, said movie film having on one side of a cellulose triacetate film support of 120μ in thickness the antistatic layer formed according to the procedure as disclosed in U.S. Pat. No. 3,753,716, and on the other side of the support an emulsion layer for color photography. On the magnetic recording layer thus formed was further coated the so-called balance strips, about 8 mm width and 12μ thick, to afford a good reeling condition of film.

Sample (6): On a carbon backing layer of a movie film were formed a magnetic recording layer and a balance stripe in the same manner as in the case of the sample (5), said movie film having on one side of a cellulose triacetate film support of 120μ in thickness the carbon backing layer in the same manner as in the case of the sample (3) and on the other side of the support an emulsion layer for color photography.

Subsequently, the samples (4), (5) and (6) were individually subjected to the adhesion tests as described in Example 1 to find that in each sample the magnetic recording layer satisfactorily adhered to the support. Further, neither deformation of film nor the sticking phenomenon was observed.

For comparison, on the other hand, the same samples as in this example were prepared but using a coating dispersion for forming a magnetic recording layer comprising a mixture of 55% by weight of 2-ethoxyethanol and 45% by weight of 1,4-dioxane as a dispersion medium, which coating dispersion was prepared in the same manner as in this example, and the samples thus prepared were individually subjected to the adhesion tests as described in Example 1 to find that the magnetic recording layer of each sample peeled off from the support when the sample was processed in the alkaline developer solution.

EXAMPLE 3

In the same manner as in Example 2, the following composition was mixed and dispersed to obtain a dispersion mixture.

| | |
|---|---|
| γ.Fe$_2$O$_3$ | 90 g |
| Cellosolve dope | 146 g |
| Nitrile rubber | 30 g |
| 2-ethoxyethanol | 234 g |

The $Fe_2O_3$ used herein was MRM 400 (produced by Toda Kogyo K.K.) and the cellosolve dope was such as prepared by dissolving 20.5% by weight of H ½ nitrocellulose (containing 25% by weight of alcohol moiety) in 2-ethoxyethanol.

The nitril rubber used herein was the same as used in Example 1.

The mixture dispersion thus obtained were subjected to filtration and removal of air bubbles in the same manner as in Example 1 to obtain a coating dispersion for forming a magnetic recording layer in a state of being favorably dispersed.

Subsequently, this dispersion for forming the magnetic recording layer was coated on three kinds of movie films, respectively, to prepare the following samples (7), (8) and (9).

Sample (7): On a carbon backing layer of a movie film was formed a magnetic recording layer by coating the coating dispersion for forming the magnetic recording layer by means of a foil type coating machine, followed by drying at room temperature for 3 minutes, said movie film having on one side of cellulose triacetate film support of 110μ in thickness the carbon backing layer comprising HP-55 (produced by Shinetsu Kagaku Kogyo K.K.) as a binder and having a thickness of 1μ and an optical density of 1.4–1.6 and on said carbon backing layer a sticking-preventive layer formed by the procedure as disclosed in Example 2 of U.S. Pat. No. 3,893,861, and on the other side of the support an emulsion layer for color photography. In this case, the said coating dispersion was coated on the carbon backing layer at a rate of 8 meter/min. In the sample thus obtained, the magnetic recording layer had a width of about 0.7 mm and a thickness of 10μ and the balance strips had a width of about 0.3 mm and a thickness of 10μ.

Sample (8): On the carbon backing layer of Kodachrome 40 for 8 mm movie film (produced by Eastman Kodak Co.) was coated the coating dispersion for forming a magnetic recording layer in the same manner as in the case of the sample (1) and dried at room temperature for 3 minutes to obtain a sample. In the sample thus obtained, the magnetic recording layer had a width of about 0.7 mm and a thickness of 10μ and the balance stripe had a width of about 0.3 mm and a thickness of 10μ.

Sample (9): On an antistatic layer was formed a magnetic recording layer in the same manner as in the case of the sample (2), except that the support used was a cellulose triacetate film support of 115μ in thickness.

Subsequently, the samples (7), (8) and (9) were individually subjected to the adhesion tests in the same manner as in Example 1 to find that in each sample, the magnetic recording layer strongly adhered to the support. Further all these samples were free from twisting and also from the sticking phenomenon.

EXAMPLE 4

The following composition was subjected to mixing in a 1 l. ball mill case containing 230 steel balls of 15 mm in diameter at 130 r.p.m. for 20 hours.

| | | |
|---|---|---|
| $\gamma.Fe_2O_3$ | 115 | g |
| Cellosolve dope | 80 | g |
| D B P | 8.5 | g |
| 2-ethoxyethanol | 91 | g |
| N,N-dimethylformamide | 40 | g |

To the above-mentioned mixture was added 164 g of cellosolve dope and the resulting mixture was subjected for 30 hours to mixing and dispersing.

The $\gamma.Fe_2O_3$ used herein was γ-MR (produced by Titan Kogyo K.K.) and the cellosolve dope was the same as used in Example 3. The mixture thus dispersed was filtered in the same manner as in Example 1 to obtain a coating dispersion for forming a magnetic recording layer in a state of being favorably dispersed. Using the thus obtained coating dispersion for forming a magnetic recording layer, a sample (10) was prepared according to the same procedure as employed in Example 1 where the sample (1) was prepared, a sample (11) was prepared likewise as in the case of the sample (2), and a sample (12) was prepared likewise as in the case of the sample (3).

The samples (10), (11) and (12) individually showed excellent adhesion thereof to the support when subjected to the adhesion tests as conducted in Example 1, without suffering from deformation of film as well as from the sticking phenomenon.

EXAMPLE 5

The following composition was kneaded in the same manner as in Example 1.

| | |
|---|---|
| $\gamma.Fe_2O_3$ | 150 g |
| Cellosolve dope | 166 g |
| Nitrile rubber | 10 g |
| Butyl Cellosolve | 60 g |

The $\gamma.Fe_2O_3$ used herein was the same as used in Example 1, and such is also the case with the nitrile rubber. The cellosolve dope used herein was the same as used in Example 3.

Subsequently, the following composition was treated in the same manner as in Example 2 to prepare a dispersed mixture.

| | |
|---|---|
| Mixture kneaded by means of three-roll mill | 400 g |
| 2-ethoxyethanol | 75 g |
| Solution of 16.7 wt% of VAGH in amyl acetate | 36 g |

The VAGH used in the above-mentioned composition was a vinyl chloride/vinyl alcohol/vinyl acetate copolymer produced and sold by Union Carbide Co.

The dispersed mixture was filtered in the same manner as in Example 1 to obtain a coating dispersion for forming a magnetic recording layer in a state of being favorably dispersed.

Subsequently, the coating dispersion was applied to three kinds of movie films to prepare the following samples (13), (14) and (15).

Sample (13): On an antistatic layer of a movie film was formed a magnetic recording layer in the same manner as in Example 3 to prepare the sample (7), said movie film having the antistatic layer formed by the same manner as in Example 2 to prepare the sample (5) on one side of a cellulose triacetate film support of 110μ in thickness, and on the other side of the support an antihalation layer containing a dyestuff as the lowermost layer relative to color emulsion layers.

Sample (14): A sample was prepared in the same manner as in Example 1 to prepare the sample (1), except that the coating dispersion for forming a magnetic recording layer used was that which had been prepared in this example.

Sample (15): On an antihalation layer of a movie film was formed a magnetic recording layer in the same manner as in Example 3 to prepare the sample (7) on one side of a cellulose triacetate film support of 115μ in thickness, and on the other side of the support an emulsion layer for color photography.

The samples (13), (14) and (15) were individually subjected to the adhesion tests as described in Example 1 to find that in each sample, the magnetic recording layer favorably adhered to the support, and also that no detrimental effect on the sample with respect to its photographic properties was observed.

For comparison, on the other hand, samples were prepared in the same manner as in the samples (13), (14) and (15), respectively, but using a coating dispersion for forming a magnetic recording layer comprising a mixture of 50% by weight of 2-ethoxyethanol, 15% by weight of butyl cellosolve and 35% by weight of amyl acetate as a dispersion medium, which coating dispersion was thus beyond the scope of the present invention. The samples thus prepared were individually subjected to the adhesion tests as described in Example 1 to find that in each sample, the magnetic recording layer peeled off from the support in an alkaline developer solution when the sample was processed therewith.

EXAMPLE 6

The following composition was treated together with a mixture of 2-ethoxyethanol and amyl acetate as a dispersion medium, while varying the proportion of the 2-ethoxyethanol to the total weight of the dispersion medium to become 30, 56, 64, 75 and 90% by weight, with a ball mill case containing 250 steel balls of 15 mm in diameter at 130 r.p.m. for 50 hours to prepare dispersed mixtures.

| | |
|---|---|
| $\gamma.Fe_2O_3$ | 92 g |
| Nitrocellulose | 39 g |
| Nitrile rubber | 19 g |
| Total amount of dispersion medium | 350 g |

The $\gamma.Fe_2O_3$ and nitrile rubber used herein were the same as those used respectively in Example 1, and the nitrocellulose used was a solution of 20.5% by weight of nitrocellulose in a 1:1 mixture of 2-ethoxyethanol and amyl acetate.

The five kinds of mixtures thus prepared by varying the proportion of components in the dispersion medium were individually subjected according to the same manner as in Example 1 to filtration and to removal of air bubbles.

The five kinds of coating dispersions for forming magnetic recording layers were individually used in the same manner as in Example 3 where the sample (7) was prepared to prepare samples (16), (17), (18), (19) and (20).

The five kinds of samples thus obtained were individually subjected to the adhesion tests of magnetic recording layer according to the procedures described in Example 1 to obtain the results as shown in the following table.

| Sample No. | Amount of 2-ethoxyethanol dispersion medium of coating dispersion for magnetic recording layer (% by weight) | Adhesive property of magnetic recording layer | | |
|---|---|---|---|---|
| | | Dry film before development | Wet film during development | Dry film after development |
| (16) | 30 | Good | All peeled off | Partly peeled off |
| (17) | 56 | Good | Partly remained, but almost peeled off | Partly peeled off |
| (18) | 64 | Good | Balance stripe partly peeled off, but practically usable | Good |
| (19) | 75 | Good | Good | Good |
| (20) | 90 | Good | Good | Good |

As is clear from the results shown in the above table, it is understood that the samples (18), (19) and (20) using the coating dispersions for forming magnetic recording layers according to the present invention are all excellent in adhesive property during the development steps, whereas the samples (16) and (17) using the coating dispersions for forming magnetic recording layers which are beyond the scope of the present invention are all poor in adhesive property during the development steps, and thus the weight proportion of 60% by weight of 2-ethoxyethanol to the total weight of the dispersion medium is critical.

What is claimed is:

1. A light-sensitive silver halide photographic material comprising a cellulose ester film support and a light-sensitive silver halide emulsion layer coated on one side of the support and a non-light sensitive layer removable during an aqueous processing step after exposure coated on the other side of the support, said photographic material comprising a magnetic recording layer on a portion of said non-light sensitive layer, which magnetic recording layer has been formed by coating a coating dispersion containing particulate magnetic material, a binder, and at least 60% by weight, based on a total weight of a the coating dispersion, of 2-ethoxyethanol as a component of the dispersion medium and thereafter drying.

2. A light-sensitive silver halide photographic material according to claim 1 wherein said non-light sensitive layer is an antihalation layer or an antistatic layer.

3. A light-sensitive silver halide photographic material according to claim 1 wherein said binder comprises nitrocelluloses.

4. A light-sensitive silver halide photographic material according to claim 1 wherein said coating dispersion further contains a natural or synthetic rubber of diolefin type polymers.

5. A light sensitive silver halide photographic material according to claim 4 wherein said nitrocelluloses have a nitrogen content of 10 to 12%.

6. A light-sensitive silver halide photographic material according to claim 1, wherein said binder is insoluble in water, and acidic and alkaline solutions.

* * * * *